United States Patent

Oshiba

Patent Number: 5,448,048
Date of Patent: Sep. 5, 1995

[54] OPTICAL CARD RECORDING/REPRODUCING APPARATUS WITH PRESETTING OF CARD SECTOR POSITION DATA FOR DETECTING SECTOR POSITIONS

[75] Inventor: Mitsuo Oshiba, Tokyo, Japan

[73] Assignee: Olympus Optical Co., Ltd., Tokyo, Japan

[21] Appl. No.: 245,364

[22] Filed: May 18, 1994

[30] Foreign Application Priority Data

May 19, 1993 [JP] Japan .................................. 5-117193

[51] Int. Cl.⁶ .............................................. G06K 7/10
[52] U.S. Cl. ...................................... 235/454; 369/32; 369/44.26
[58] Field of Search .............. 235/454; 283/904, 283; 369/32, 44.26, 44.28

[56] References Cited

U.S. PATENT DOCUMENTS

| | | | |
|---|---|---|---|
| 4,885,458 | 12/1989 | Horiguchi et al. | 283/904 X |
| 4,950,876 | 8/1990 | Saito | 235/476 |
| 5,113,061 | 5/1992 | Tanaka | 235/454 |
| 5,132,522 | 7/1992 | Oshiba | 235/454 |
| 5,161,136 | 11/1992 | Segawa | 369/32 |
| 5,170,385 | 12/1992 | Senshu et al. | 369/32 X |
| 5,285,433 | 2/1994 | Oshiba et al. | 369/44.26 |
| 5,293,568 | 3/1994 | Oshiba et al. | 369/32 |
| 5,339,300 | 8/1994 | Akatsuka et al. | 235/454 X |

FOREIGN PATENT DOCUMENTS 2-154364  6/1990  Japan .
2-210617  8/1990  Japan .

*Primary Examiner*—Donald Hajec
*Assistant Examiner*—Michael G. Lee
*Attorney, Agent, or Firm*—Frishauf, Holtz, Goodman, Langer & Chick

[57] ABSTRACT

An optical card recording/reproducing apparatus scans a track of an optical card which includes a data portion at a center and ID portions at both ends. Each of the ID portions includes first and second address areas (identical address), a first sync area preceding the first address area, a second sync area between the first and second address areas, a third sync area succeeding the second address, a preamble preceding the first sync area, and a postamble (the preamble and the postamble are identical signals) succeeding the third sync signal. This apparatus comprises a RAM for storing data indicating the start and end points of each ID portion and of each sector with reference to a predetermined position of a track (e.g., the left end of the left ID portion), a counter for counting the relative moving distance of the optical card, and detection circuit for detecting the position of a sector by comparing the output from the counter with the data of the RAM. If a sync area is detected after detection of the preamble, the first address is demodulated. If a sync signal is detected after the demodulated address is error-corrected, data corresponding to the position of the boundary between the third sync signal and the postamble is preset to the counter.

9 Claims, 9 Drawing Sheets

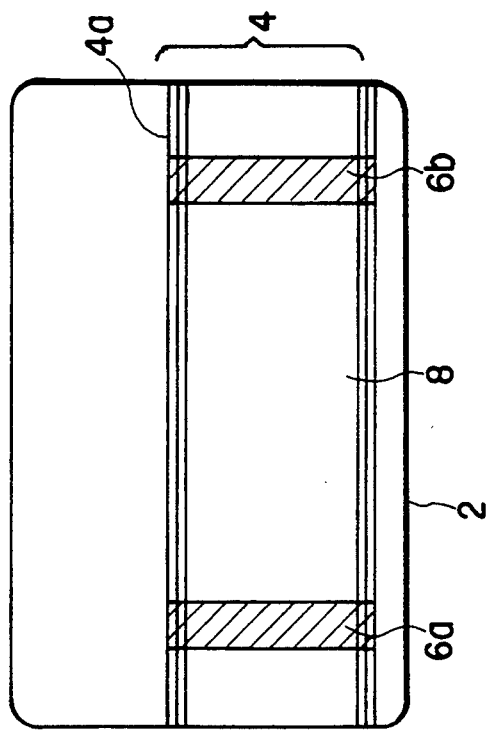
FIG. 1 (PRIOR ART)
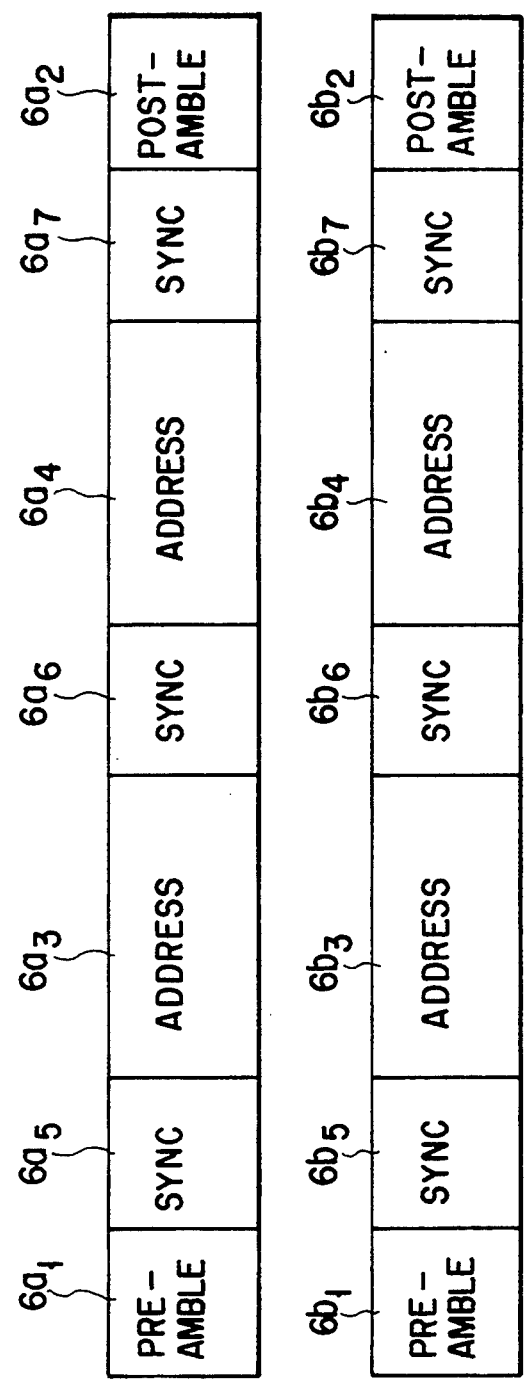
FIG. 2A (PRIOR ART)
FIG. 2B (PRIOR ART)

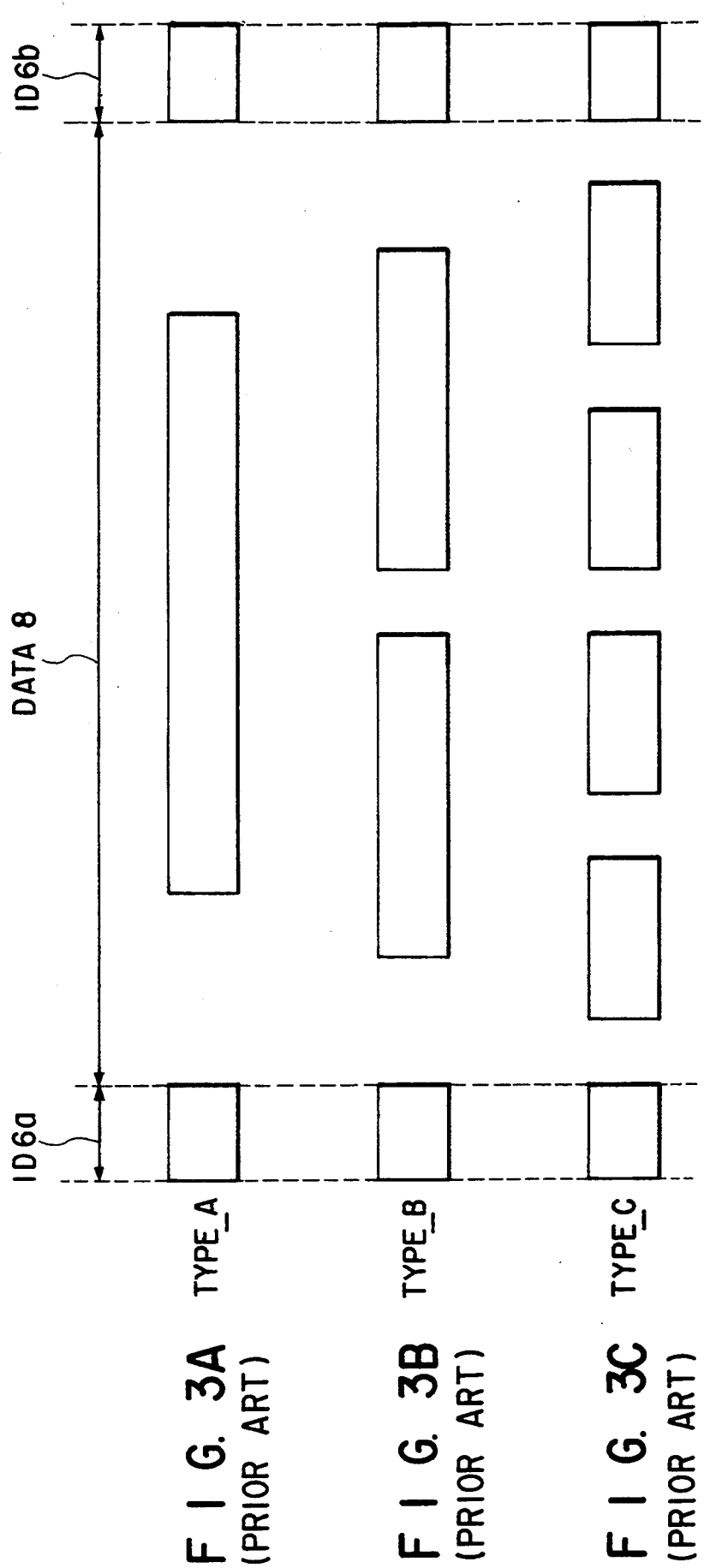

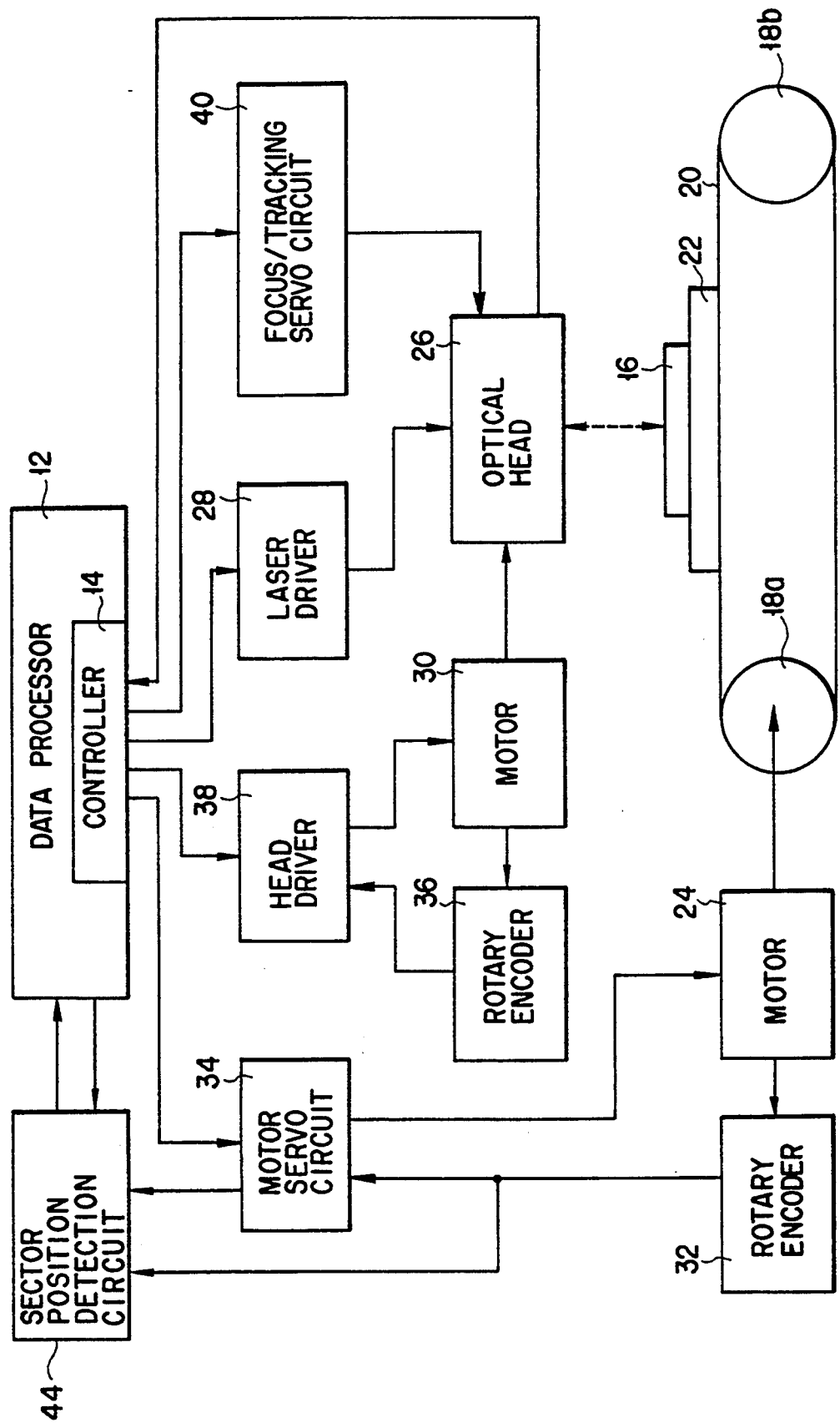
F I G. 4

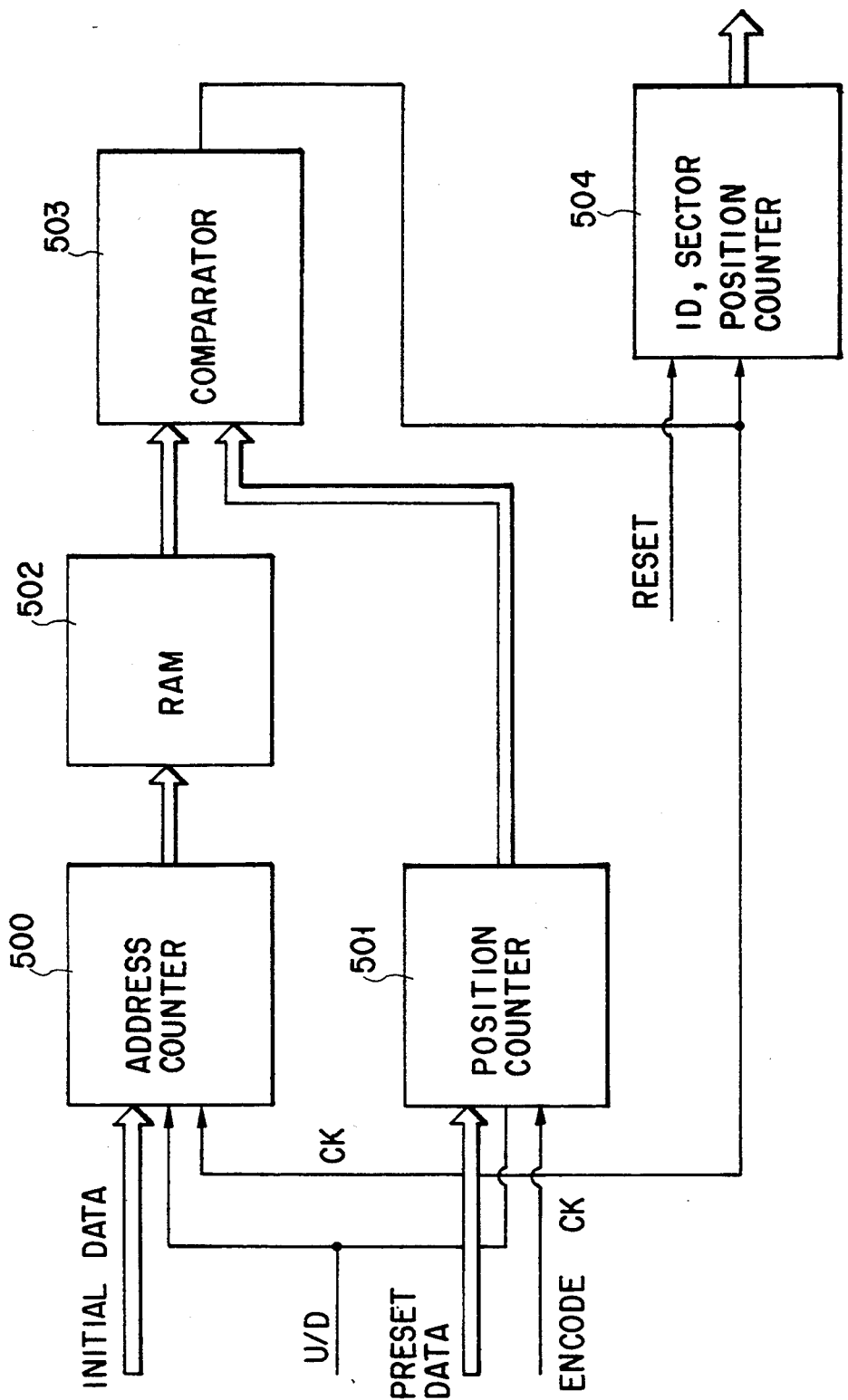
F I G. 8

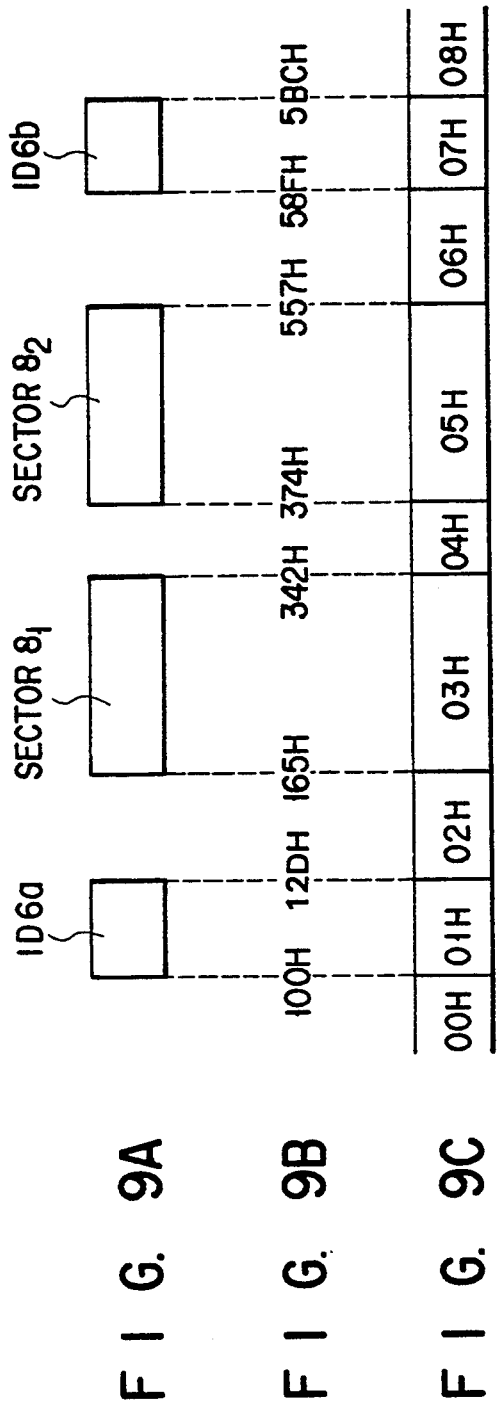

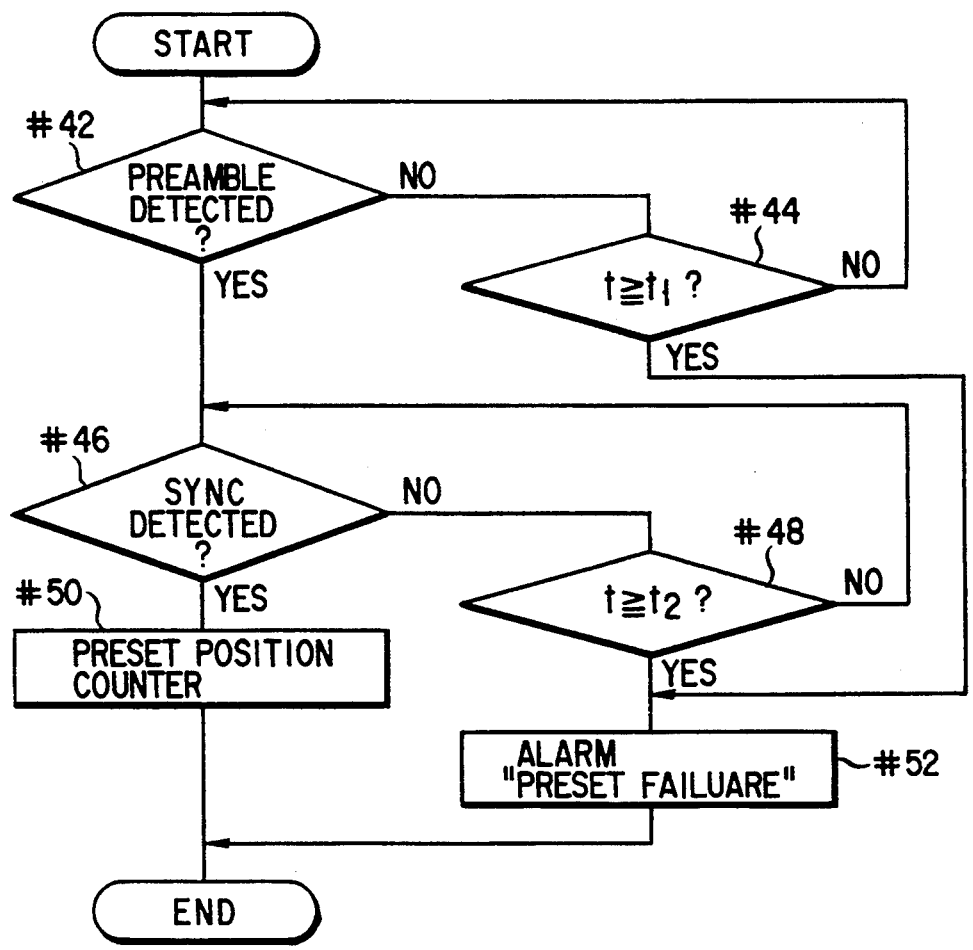
F I G. 12

OPTICAL CARD RECORDING/REPRODUCING APPARATUS WITH PRESETTING OF CARD SECTOR POSITION DATA FOR DETECTING SECTOR POSITIONS

BACKGROUND OF THE INVENTION

1. Field of the Invention

The present invention relates to an optical card recording/reproducing apparatus for recording and reproducing data by using an optical card.

2. Description of the Related Art

A recent progress of technologies related to data processing is remarkable, and means for recording data with a larger capacity have been developed accordingly. As one of these means, an apparatus for optically recording and reproducing data has attracted attention.

Among other apparatuses of this sort, an optical card recording/reproducing apparatus, which uses an optical card as a recording medium and performs recording and reproduction of data with respect to this optical card, has been put into practical use.

In this apparatus, laser beam focused by a lens is radiated on a data recording layer (light reflecting layer) of the optical card to form a pit (nonreflective portion) in the recording layer by using the resulting thermally irreversible change, thereby writing data. The optical card has a recording capacity several to ten thousand times as large as that of a conventionally used magnetic card. The memory capacity of the optical card is one to two megabytes, an extremely large value, although rewrite of data is impossible as in an optical disk. Therefore, it is possible to use the optical card in a wide variety of applications, such as a bankbook, a pocket map, and a prepaid card for use in shopping. By using the characteristic that data rewrite is impossible, it has also been attempted to use the optical card in applications, such as a private health care card, in which data must not be altered.

FIG. 1 shows an example of the optical card of the above sort. An optical recording portion 4 formed of a plurality of parallel tracks 4a is formed on the surface of an optical card 2 having a shape equivalent to that of a credit card or the like. Data can be recorded by forming data pits on these tracks 4a and reproduced by reading the data pits. The data read/write is performed by scanning a light beam emitted from an optical head (not shown) on the tracks 4a. This scan is normally done by repeatedly moving the optical card 2 in the direction of the tracks. Therefore, the scan direction during data write is sometimes opposite to that during data read. In these cases, a data string to be read out from one track is reversed in the direction of time by using a buffer memory. Consequently, data read can be performed correctly.

ID portions 6a and 6b are formed at the two ends of each track 4a. In the ID portions 6a and 6b of each track, data (ID data) indicating the track address corresponding to that track is recorded. The ID portions 6a and 6b are formed at positions inside the ends of the card by a predetermined distance (e.g., 4 mm), since the end portions of the track 4a are readily damaged or contaminated and hence are not reliable, and in order that the relative moving velocity between the optical card 2 and the optical head (light beam) in the track direction be sufficiently stabilized. A data portion 8 for recording data is formed inside the ID portions 6a and 6b. The ID portions 6a and 6b are formed on the two ends of the data portion 8 to allow read-out of the track addresses in both the directions, since the scan is performed of reciprocal movement as discussed above and reproduction is done in both the directions. Therefore, in the arrangement illustrated in FIG. 1, the ID portion 6a on the left is read when the light beam moves from the left to the right along the tracks, and the ID portion 6b on the right is read when the light beam moves from the right to the left, thereby identifying the track addresses. In this manner, the ID data can be read before the data portion 8 is read regardless of the scan direction. The data to be recorded in the ID portions 6a and 6b and in the data portion 8 is normally error-correction-coded by, e.g., Reed-Solomon product coding. This error-correction-coded data is then modulated by, e.g., 8–10 modulation and mark-length-recorded. The mark-length-recording means recording in which the length of a pit changes in accordance with recording data.

In the apparatus for performing recording and reproduction by using the optical card as described above, the position of the data portion on the optical card is predetermined. Therefore, it is important to correctly detect the positional relationship between the optical card and the optical head. This is so because the optical card is loaded on an optical card conveyor table and scanned by the optical head by reciprocally moving the conveyor table, but the optical card is not necessarily placed at the same position in each scan when loaded on the conveyor table. The position of the conveyor table can be detected by counting signals from a rotary encoder attached to a motor for moving the conveyor table. To compensate for a positional difference of the optical card from the conveyor table, however, it is necessary to detect a predetermined position on the optical card and preset a value corresponding to the predetermined position in a counter at the timing of the detection.

One example of this presetting is described in U.S. Pat. No. 4,950,876 assigned to the assignee of the present application. This USP discloses that a counter is preset when the start position of a data portion is detected. The start position of the data portion is detected only when at least one byte of data is continuously detected. However, with this technique, an erroneous value may be preset if data is not detected correctly.

Another example of the presetting is described in Japanese Patent Publication (KOKAI) No. 2-154364 (Publication date: Jun. 13, 1990) filed by the assignee of the present application. In the optical card apparatus disclosed in this publication No. 2-154364, track address data is detected from an ID portion which is read before read of a data portion, and a predetermined value is preset in a counter at the timing at which an optical head reaches the boundary between the ID portion and the data portion.

The method described in this publication, however, cannot be used for an optical card with a format in which address portions are recorded in each of ID portions in a multiple manner as mentioned below.

Recently, multiple-recording of address data (e.g., double-recording) into an ID portion has been attempted in order to ensure address data read. FIGS. 2A and 2B illustrate the ID portions 6a and 6b of a card of this type. Referring to FIGS. 2A and 2B, preamble portions $6a_1$ and $6b_1$ are formed on the left ends, and postamble portions $6a_2$ and $6b_2$ on the right ends. A fixed pattern (e.g., "101010. .") for recording a bit sync signal as a reference clock for modulated data is recorded in the preamble portions $6a_1$ and $6b_1$. Exactly the same pattern as that in the preamble portions is recorded in the postamble portions $6a_2$ and $6b_2$. A plurality of (in this example, two) address portions $6a_3$ and $6a_4$ ($6b_3$ and $6b_4$) are recorded between the preamble portion and the postamble portion. Sync portions $6a_5$, $6a_6$ and $6a_7$ ($6b_5$, $6b_6$ and $6b_7$) are recorded before and after these address portions. Each sync portion has a fixed pattern for recording a byte sync signal. Normally, the sync pattern is a pattern which does not violate a modulation rule but never appears in recorded data. In the address portions $6a_3$ and $6a_4$ ($6b_3$ and $6b_4$), two-byte track addresses, for example, which are error-correction-coded into $(6\times 5)$-byte Reed-Solomon product codes and subjected to 8-10 modulation, are mark-length-recorded. The same track address data is recorded in these address portions $6a_3$ and $6a_4$ ($6b_3$ and $6b_4$), and no signal for identifying these portions $6a_3$ and $6a_4$ ($6b_3$ and $6b_4$) is recorded.

Assume that preset is performed of detecting the sync portions $6a_5$, $6a_6$ and $6a_7$ of the ID portion $6a$ in the above arrangement. In this case, since the patterns $6a_5$, $6a_6$ and $6a_7$ have precisely the same content although their positions are different, it is impossible to determine which sync pattern is detected. Consequently, an optical head and an output from a counter cannot be correctly related to each other. Likewise, since the preamble portion $6a_1$ and the postamble portion $6a_2$ have the same content although their positions are different, it is impossible to correctly relate the optical head and the counter output to each other. Furthermore, the optical head and the counter output cannot be correctly related to each other for the track address portions $6a_3$ and $6a_4$, because these address portions also have exactly the same pattern.

The data portion 8, on the other hand, can have various formats as shown in FIGS. 3A to 3C. TYPE_A, TYPE_B, and TYPE_C in FIGS. 3A, 3B, and 3C are format examples in which the data portion 8 is formed of one sector, two sectors, and four sectors, respectively. In the format TYPE_A, user data has 1,024 bytes. In the format TYPE_B, user data has 512 bytes per sector and $512\times 2=1,024$ bytes per track. In the format TYPE_C, user data has 256 bytes per sector and $256\times 4=1,024$ bytes per track.

The data portion 8 of the conventional optical card 2 can be formed of different sector types, such as TYPE_A, TYPE_B and TYPE_C, in order to meet various applications. Accordingly, to meet these different sector types, it has been attempted to make it possible to select a given point as the start point of data recording/reproduction in the data portion 8 in the conventional optical card recording/reproducing apparatus.

One example of this is disclosed in the optical card recording/reproducing apparatus described in Japanese Patent Publication (KOKAI) No. 2-210617 (Publication date: Aug. 22, 1990) invented by the inventor of the present application and filed by the assignee of the present application. In this apparatus, an output from a counter for detecting the position of an optical card is compared with a reference value for representing a start point of a data sector, and, if the two values coincide with each other, it is determined that the position of the optical card is the start point of the data sector. In this arrangement, the reference value can be property switched from one value to another in accordance with a format. However, this conventional example does not refer to the presetting of the counter at all.

SUMMARY OF THEE INVENTION

Accordingly, it is an object of the present invention to provide an optical card recording/reproducing apparatus capable of correctly presetting the count of a counter means for detecting the position of an optical card conveyor table means in accordance with the loaded state of the optical card on the optical card conveyor table means.

A related object of the present invention is to provide an optical card recording/reproducing apparatus capable of correctly detecting the sector start positions of optical cards having different formats, in which the numbers of sectors forming a data portion are different, thereby coping with various types of optical cards.

According to the present invention, there is provided an optical card recording/reproducing apparatus for recording and/or reproducing data by relatively moving a recording/reproducing head and an optical card which has a track in which a data section is positioned at a center and identification sections are positioned at both ends, the data section comprises a number of sectors which number is determined according to a format, the identification sections comprises at least two address areas, first synchronization areas adjacent to and between the address areas and second synchronization areas at both ends of the identification sections, in a direction of the track, the apparatus comprising:

means for storing data representing positions of the sectors measured from the identification section;

means for counting an amount of relative movement of the recording/reproducing head and the optical card;

means for detecting the first synchronization area and the second synchronization area;

means for presetting a predetermined count value to the counting means when the detecting means detects the second synchronization area and then detects the first synchronization area; and means for detecting the position of the sector by comparing the count value of the counting means and the data stored in the storing means.

According to the present invention, there is provided another optical card recording/reproducing apparatus for recording and/or reproducing data by relatively moving a recording/reproducing head and an optical card having a track in which a data section is located at a center and identification sections are located at both ends, the data section comprises a number of sectors which number is determined according to a format, the identification sections comprises first and second address areas, a first byte synchronization area preceding to the first address area, a second byte synchronization area between the first and second address areas, a third-byte synchronization area succeeding to the second address area, a first bit synchronization area preceding to the first byte synchronization area and a second bit synchronization area succeeding to the second byte synchronization area, in a direction of the track, the apparatus comprising:

means for storing data representing positions of the sectors measured from a predetermined point of the track;

means for counting an amount of relative movement of the recording/reproducing head and the optical card;

means for detecting the bit synchronization area and the byte synchronization area;

means for demodulating and error-correcting the first address when the erecting means detects the first bit synchronization area and then detects the first byte synchronization area, and for presetting the counting means with a count value representing a position between the third byte synchronization area and the second bit synchronization area measured from the predetermined point of the track when the detecting means detects the third byte synchronization area after a demodulated first address is error-corrected; and means for detecting the position of the sector by comparing the count value of the counting means and the data stored in the storing means.

According to the present invention, there is provided still another optical card recording/reproducing apparatus for recording and/or reproducing data by relatively moving a recording/reproducing head and an optical card having a track in which a data section is located at a center and identification sections are located at both ends, the data section comprises a number of sectors which number is determined according to a format, the identification sections comprises first and second address areas, a first byte synchronization area preceding to the first address area, a second byte synchronization area between the first and second address areas, a third-byte synchronization area succeeding to the second address area, a first bit synchronization area preceding to the first byte synchronization area and a second bit synchronization area succeeding to the second byte synchronization area, in a direction of the track, the apparatus comprising:

means for storing data representing positions of the sectors measured from a predetermined point of the track;

means for counting an amount of relative movement of the recording/reproducing head and the optical card;

means for detecting the bit synchronization area and the byte synchronization area;

means for presetting the counting means with a count value representing a position between the third byte synchronization area and the second bit synchronization area measured from the predetermined point of the track when the detecting means detects the first bit synchronization area and then detects the first byte synchronization area; and means for detecting the position of the sector by comparing the count value of the counting means and the data stored in the storing means.

According to the present invention, there is provided further optical card recording/reproducing apparatus for recording and/or reproducing data by relatively moving a recording/reproducing head and an optical card having a track formed of a data section and first and second identification sections, in a direction of the track, the apparatus comprising:

means for counting an amount of relative movement of the recording/reproducing head and the optical card;

means for detecting the first and the second identification areas; and means for presetting the counting means with a predetermined count value when the detecting means detects both of the first and the second identification areas.

According to the present invention, the initialization timing of the counter for outputting a value corresponding to an amount of relative movement between the optical card and the laser beam is determined by the combination of the detection results of the two types of sync signals in the ID portion. Consequently, a reliable preset operation of the counter can be realized.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a view showing an example of an optical card;

FIGS. 2A and 2B are views showing the arrangements of the ID portions of an optical card;

FIGS. 3A, 3B and 3C are views showing the arrangements of a data portion;

FIG. 4 is a block diagram showing the arrangement of a first embodiment of an Optical card recording/reproducing apparatus according to the present invention;

FIG. 8 is a block diagram showing the circuit configuration of a sector position detection circuit;

FIGS. 9A, 9B and 9C are views for explaining the operation of the sector position-detection circuit;

FIG. 10 is a view showing the data and an address of a RAM of the sector position detection circuit;

FIG. 12 is a flow chart showing a preset operation for a position counter according to a second embodiment of the present invention.

DETAILED DESCRIPTION OF THE PREFERRED EMBODIMENTS

Figure 5:
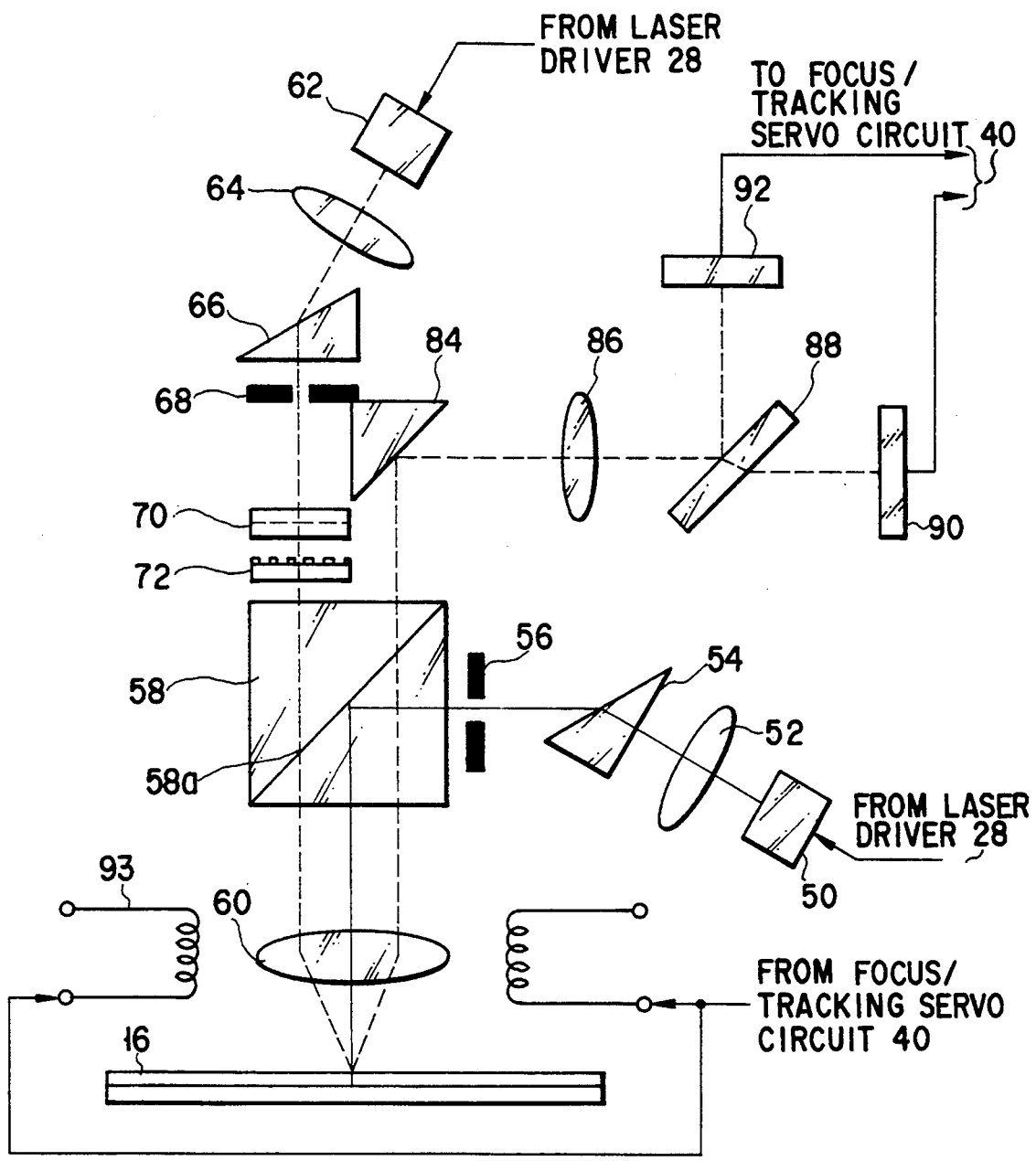
FIG. 5 is a view showing the arrangement of an optical head.

A preferred embodiment of an optical card recording/reproducing apparatus according to the present invention will now be described with reference to the accompanying drawings.

An optical card recording/reproducing apparatus is generally of a so-called single-track read type in which light emitted from an optical head is radiated on a single track to read out data in units of tracks. In an apparatus of this type, the reproduction rate of data is determined by the relative velocity between the optical head and the recording medium and hence cannot be higher than the relative velocity. Therefore, apparatuses of a so-called multi-track simultaneous read type in which light emitted from an optical head is radiated on a plurality of tracks to read out data simultaneously from these tracks are beginning to be used. The apparatuses of the multi-track simultaneous read type are further divided into two types according to the number of light sources. The first type includes a single light source and the light beam is shaped so as to cover plural tracks. The second type includes plural light sources and the light beams emitted from the light sources are irradiated onto plural tracks. The following description will be directed to the multi-track simultaneous read type having a single light source. However, the present invention can be applied to the multi-track simultaneous read type having plural light sources and the single-track read type.

FIG. 4 is a block diagram schematically showing the structure of an apparatus for optically reproducing data on an optical card. A data processor 12 manages the various types of required control operations of the whole system and has a controller 14 for controlling each of the elements that are to be controlled. The data processor 12 performs data write and processes readout data. Write data and the readout data may be exchanged with an external host system, or the data processor 12 itself may have an input/output means.

When an optical card 16 is inserted in the apparatus main body through an insertion port formed in a housing (not shown), the optical card 16 is loaded on a conveyor table 22 provided at a predetermined position on a conveyor belt 20 applied between a pair of pulleys 18a and 18b that are arranged at a predetermined distance.

The optical card 16 has the same structure as that shown in FIG. 1 and has a data recording portion 4 in which a plurality of tracks 4a are arranged. ID portions 6a and 6b are arranged in the vicinities of the two ends of each track 4a. A data portion 8 is arranged in the area sandwiched between the ID portions 6a and 6b. The formats of the ID portions 6a and 6b is the same as those shown in FIGS. 2A and 2B. The format of the data portion 8 may be one of the formats shown in FIGS. 3A to 3C.

A motor 24 is connected to the pulley 18a. When the motor 24 is controlled to rotate in the clockwise/counterclockwise direction, the pulley 18a is rotated in the clockwise/counterclockwise direction. When the pulley 18a is rotated in the clockwise/ counterclockwise direction, the conveyor belt 20 is moved in the forward-/reverse direction, thereby reciprocally moving the conveyor table 22. Then, the optical card 16 loaded on the conveyor table 22 can be repeatedly moved in the direction of tracks.

The apparatus has an optical head 26 for recording or reading data by radiating a light beam on the tracks of the optical card 16. The optical head 26 is connected to a laser driver 28. The laser driver 28 drives a semiconductor laser provided in the optical head 26 for generating the light beam, and is connected to the controller 14. The controller 14 controls to drive the semiconductor laser, thereby controlling radiation of the light beam emitted from the optical head 26 onto the optical card 16. The optical head 26 is arranged at a position above, e.g., the central position of an area (between the pulleys 18a and 18b) where the conveyor belt 20 is disposed. The optical head 26 is connected to a motor 30. When the motor 30 is driven, the optical head 26 can be moved in a direction perpendicular to the moving direction of the conveyor belt 20, i.e., in a direction across the tracks of the optical card 16 loaded on the conveyor table 22.

With this structure, the optical head 26 and the optical card 16 are moved relative to each other in the direction of the track. Therefore, each track of the optical card 16 can be scanned by the optical head 26.

The motor 24 is connected to a rotary encoder 32 for detecting the position of the conveyor table 22 with respect to the optical head 26. The rotary encoder 32 generates a pulse at every predetermined rotational angle. One pulse of the rotary encoder 32 corresponds to, e.g., the relative moving amount of 50 $\mu$m of the conveyor table 22 with respect to the optical head 26.

The motor 24 is controlled by a motor servo circuit 34. The motor servo circuit 34 is connected to the rotary encoder 32 and the controller 14. The motor servo circuit 34 detects the convey speed of the optical card 16 based on the positional data sent from the rotary encoder 32 and controls the rotational speed of the motor 24. In this case, a control command is sent from the controller 14 to the motor servo circuit 34 so that the convey speed becomes a constant speed in the range from the ID portions 6a to 6b, in FIG. 1, of the optical card 16, and the rotational speed of the motor 24 is controlled based on the convey speed of the optical card 16.

The motor 30 connected to the optical head 26 is connected to a rotary encoder 36 for detecting the position of the optical head 26 with respect to (the tracks of) the optical card 16 in a manner similar to that of the motor 24. The motor 30 and the rotary encoder 36 are connected to an optical head driver 38, and the motor 30 is controlled by the optical head driver 38. The optical head driver 38 is connected to the controller 14. A control command is sent from the controller 14 to the optical head driver 38 based on the positional data and the like sent from the rotary encoder 36, thereby controlling the motor 30.

A focus/tracking servo circuit 40 is provided in the apparatus and connected to the optical head 26 and the controller 14. The focus/tracking servo circuit 40 drives the optical head 26 in the focusing direction and a direction perpendicular to the tracks based on a focus error signal and a tracking error signal generated by the light beam reflected by the optical card 16. Then, the incident light always traces the target track of the optical card 16 in the in-focus state.

A sector position detection circuit 44 is also connected to the data processor 12 and the rotary encoder 23. As described later, the sector position detection circuit 44 comprises a counter for counting a clock output from the rotary encoder 32 and a comparator for comparing a count value of the counter with predetermined values corresponding to the start position of the data portion such as shown in FIGS. 3A to 3C. When the comparator detects a coincidence between two inputs, the data processor 12 identifies the sector start position as the start position of the data writing and the data reading.

Figure 6:
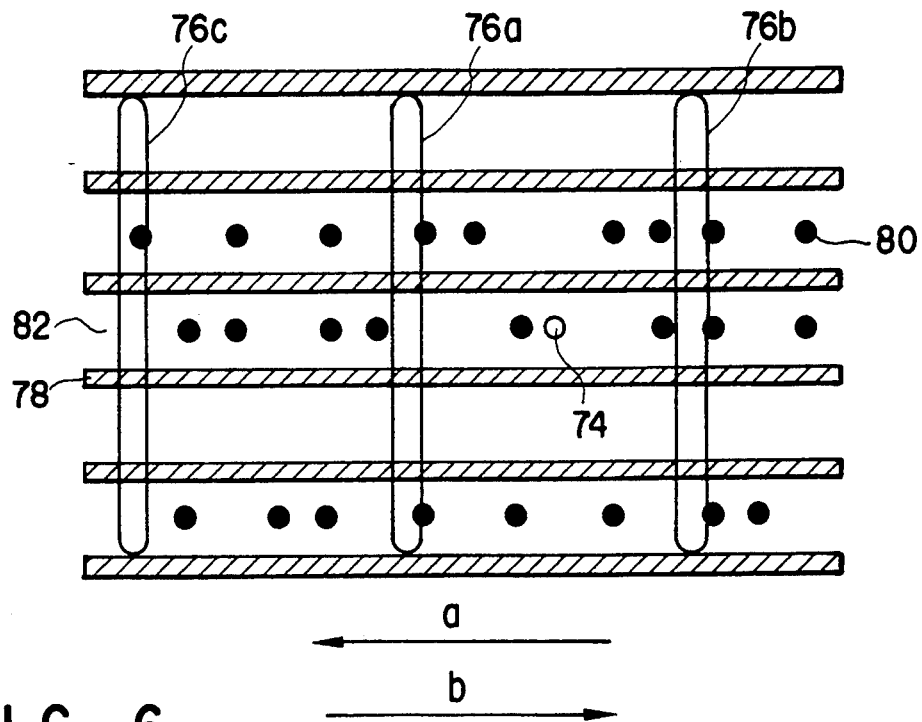
FIG. 6 is a view showing the positional relationship between a recording light beam spot formed on an optical card and spots of diffracted light of a reproducing light beam.
Figure 7:
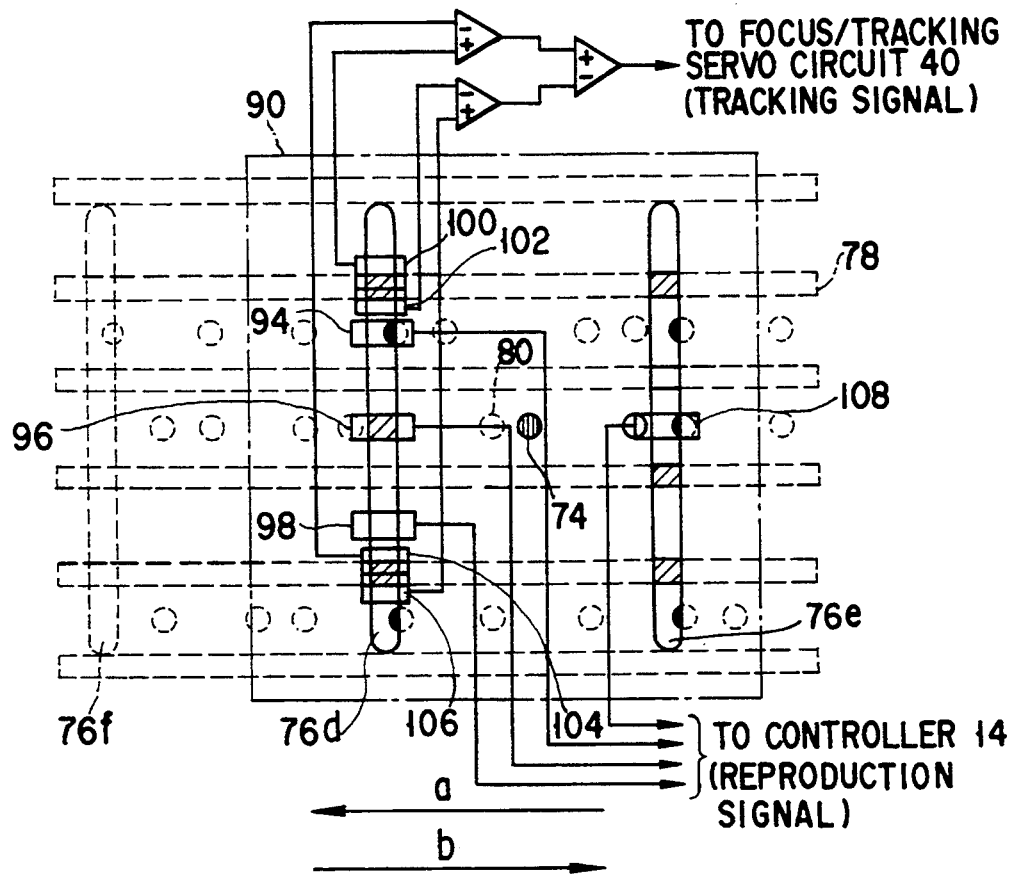
FIG. 7 is a view showing a spot image of a recording light beam projected on a photodetector, and spot images of 0th-order diffracted light and first-order diffracted light of a reproducing light beam.

A structure of the optical head 26 used by the optical card data reproducing apparatus described above, the positional relationship between the recording and reproducing light beam spots formed on the optical card 16 by the optical head 26, and the spot images of the recording and reproducing light beams projected on the photodetector in the optical head 26 will be described with reference to FIGS. 5 to 7. FIG. 5 is a view showing a structure of the optical head 26 provided in the optical card data reproducing apparatus. FIG. 6 is a view showing the positional relationship between the recording and reproducing light beam spots formed on the optical card 16. FIG. 7 is a view showing the spot images of the recording and reproducing light beams projected on the photodetector in the optical head 26.

As shown in FIG. 5, a semiconductor laser 50 serving as a data recording light source is provided in the optical head 26. The semiconductor laser 50 generates a laser beam upon reception of a drive signal from the laser driver 28 that operates under the control of the controller 14. The light beam generated by the semiconductor laser 50 is collimated to a parallel beam having a substantially elliptic section by a collimator lens 52. The parallel beam is shaped by a shaping prism 54 to have a substantially circular section as only the short-axis component of the ellipse is enlarged. Thereafter, the diameter of the parallel beam is reduced by a circular stop 56 such that the spot of the parallel beam has a predetermined size on the recording medium (the optical card 16). Then, the parallel beam is incident on a polarization beam splitter 58.

Since the recording light beam mostly formed of S-polarized light components due to the nature of the semiconductor laser 50, most components of the beam are reflected by a reflecting surface 58a of the polarization beam splitter 58 and incident on the optical axis of an objective lens 60. This light beam is focused by the objective lens 60 to form a circular spot on the optical card 16. Then, the energy density of the optical card 16 is locally increased to cause a thermally irreversible change in recording layer (data portion 8) of the optical card 16, thereby forming a recording pit.

The objective lens 60 is driven by an objective lens driving means 93 so as to be brought close to or separated from the card on the basis of a focus error signal, and focusing control is performed such that the light beam is kept in an in-focus state on the card 16. The objective lens 60 is driven by the objective lens driving means 93 in the direction perpendicular to the tracks on the basis of a tracking error signal, and tracking control is performed such that the light beam is kept at center of the track.

A semiconductor laser 62 is provided as the data reproducing light source independently of the semiconductor laser 50. The laser diode 50 and the semiconductor laser 62 are connected to the laser driver 28. A light beam generated by the semiconductor laser 62 passes through a collimator lens 64 to be collimated to a parallel beam having a substantially elliptic section. Then, this parallel beam is shaped by a shaping prism 66 to have a substantially circular section as only the short-axis component of the ellipse is enlarged. Thereafter, the diameter of this parallel beam having the circular section is further reduced by a circular stop 68 such that the spot of the parallel beam has a predetermined size on the recording medium. Then, the parallel beam is incident on a plano-concave cylindrical lens 70.

This reproducing light beam is refracted only in a plane perpendicular to the optical axis by the plano-concave cylindrical lens 70 so that the light beam slightly diverges in this direction. Furthermore, the light beam is divided into a 0th-order diffracted beam and two first-order diffracted beams by a diffraction grating 72. At this time, assume that the plano-concave cylindrical lens 70 and the diffraction grating 72 are disposed at such positions that the diverging direction of the light beam diverged by the plano-concave cylindrical lens 70 and the diffracting direction of the light beam diffracted by the diffraction grating 72 are substantially orthogonal.

Since the three light beams divided by the diffraction grating 72 mostly consist of P-polarized components due to the nature of the semiconductor laser 62, most components of the beams pass through the polarization beam splitter 58 and are incident on the objective lens 60 at a position which is offset from the optical axis by a predetermined length. These light beams are focused by the objective lens 60 to form three spots as images on the optical card 16. Since the light beam is diverged in one direction by the plano-concave cylindrical lens 70, the respective light beam spots are enlarged in the diverging direction to form elliptic spots on the optical card 16.

FIG. 6 shows the positional relationship between the recording and reproducing light beam spots formed on the optical card 16.

A recording light beam spot 74 is formed to be located either between a spot 76a formed by the 0th-order diffracted light of the reproducing light beam and a spot 76b formed by the first-order diffracted light of the reproducing light beam, or between the spot 76a and a spot 76c formed by the first-order diffracted light of the reproducing light beam. The layout of the respective spots is adjusted by imparting a relative angular difference between the optical axis of the recording light beam and that of the reproducing light beam before being incident on the objective lens 60 when the optical head is assembled and adjusted. The cylindrical lens 70 is disposed such that the enlarging direction of the reproducing light beam spots 76a, 76b and 76c on the optical card 16 is substantially perpendicular to the extending direction of the tracks. Therefore, each of the elliptic reproducing light beam spots 76a, 76b and 76c is distributed across the plurality of tracks, and data of the plurality of tracks can be simultaneously reproduced.

The spots 76a, 76b and 76c formed by the diffracted light of the reproducing light beam are regularly reflected by the optical card 16 as their amounts of light are modulated by track guides 78 and the presence/absence of a data pit 80 on the optical card 16. Each track guide 78 is provided between adjacent tracks 82. The tracks 82 are areas having a high reflectance, while the track guides 78 and the pits 80 are areas having a low reflectance. These reflected light beams pass through the objective lens 60 at a position which is offset from the optical axis at the other side of the incident light by the predetermined length. Since the reflected light is regularly reflected by the optical card 16, it substantially has the P-polarized components, and most components are guided to a reflecting mirror 84 through the polarization beam splitter 58. Then, after the reflected light is reflected by the reflecting mirror 84, it is focused by a condenser lens 86 and split by a half mirror 88. The split light components are incident on either the light-receiving surface of a signal reproducing/tracking photodetector 90 and the light-receiving surface of a focusing photodetector 92 to enlarge and project the spot images.

At this time, since the reproducing light beam is incident on a position of the objective lens 60 which is offset from the optical axis, so-called off-axis focus detection is performed. The focusing photodetector 92 has, e.g., two-divided photodetectors for detecting the movement of the image of the reproducing light beam spot caused by a focusing error. Then, a focusing error signal corresponding to the focusing error is generated.

FIG. 7 shows the spot image of the recording light beam and the spot images of the diffracted reproducing light beams that are projected on the signal reproducing/tracking photodetector 90.

Signal reproducing photodetector elements 94, 96 and 98 and tracking photodetector elements 100, 102, 104 and 106 are arranged on the photodetector 90. In addition, a signal reproducing photodetector element 108 is provided to the photodetector 90 at a position where an image 76e corresponding to the spot 76b of the first-order diffracted beam is formed when images 76d, 76e and 76f as the enlargingly projected images of the reproducing light beams are formed at appropriate positions on these photodetector elements without tracking and focusing errors.

The tracking photodetector elements 100 and 102 and 104 and 106 detect a positional change in images of the track guides 78 caused by a tracking error as a change in amounts of received light, and generate tracking error signals. The signal reproducing photodetector elements 94, 96 (or 108) and 98 detect the presence/absence of data pits of three tracks from a change in amounts of light, and output reproduction signals.

In data recording, when the optical card 16 moves in the direction of an arrow "a" (reverse direction), as shown in FIG. 6, the data pits 80 formed by the recording light beam spot 74 are moved toward the spot 76c formed by one first-order diffracted reproducing light beam. When the data pits 80 reach the position of the spot 76a, a change in amount of light is caused in the signal reproducing photodetector element 96 on the photodetector 90, and a reproduction signal is output. Therefore, a reproduction signal immediately after recording can be obtained, and verification is performed based on this reproduction signal to check if recording is performed with or without an error.

When the moving direction of the optical card 16 is reversed so that the optical card 16 moves in the direction of an arrow "b" (forward direction), the data pits 80 formed by the recording light beam spot 74 are moved toward the spot 76b formed by the other first-order diffracted reproducing light beam. When the data pits 80 reach the position of the spot 76b, a change in amount of light is caused in the signal reproducing photodetector element 108, and a reproduction signal immediately after recording can be obtained from this change in amount of light. Then, verification is performed based on this reproduction signal.

Hence, a reproduction signal can be obtained immediately after recording even when the optical card 16 is moved in the forward or reverse direction. In other words, a reproduction signal can be obtained immediately after recording regardless of the moving direction of the optical card 16 that is reciprocally moved with respect to the optical head 26, and verification can be performed to check if recording is performed with or without an error.

FIG. 8 illustrates the configuration of the sector position detection circuit 44 mentioned earlier in connection with FIG. 4. This sector position detection circuit 44 includes an address counter 500 in which an initial value from the controller 14 is preset when the track scan is started, and a position counter 501 in which predetermined position data from the controller 14 is preset when a predetermined area (data) is detected during the track scan. The address counter 500 is a counter for generating addresses of a RAM 502 and is an up-down counter with a preset function. The counter 500 receives an output from a comparator 503, as a clock signal, and also receives, at its up-down control terminal, a direction indication signal U/D which indicates the direction of the relative movement between the optical card 16 and the optical head 26. This direction indication signal U/D is supplied from, e.g., the motor servo circuit 34 in FIG. 4.

The position counter 501 is also an up-down counter with a preset function. The position counter 501 receives, at its up-down control terminal, the direction indication signal U/D supplied from the motor servo circuit 34, and also receives an output encode clock from the rotary encoder 32, as a clock signal.

In the RAM 502, position data indicative of the start and end positions of the ID portion and the start and end positions of the sector according to the format of an optical card is preset by the controller 14, e.g., at the time of start of the track by the optical head 24. The RAM 502 transfers the position data designated by an address supplied from the address generating counter 500 to the comparator 503.

The comparator 503 compares the output from the RAM 502 with the output from the position counter 501. If the two outputs coincide with each other, the comparator 503 generates a signal "1" (a binary signal of level 1).

The output from the comparator 503 is supplied to the address counter 500 and to an ID/sector position counter 504. The counter 504 is a resettable counter which is reset (initialized) by the controller 14 whenever the direction of the relative movement between the optical card 16 and the optical head 26 reverses, and counts up whenever the comparator 503 outputs the signal "1".

FIGS. 9A to 9C are views for explaining the operation of the sector position detection circuit 44 with the above arrangement. The operation will be explained below by taking TYPE_B (two-sector type) discussed earlier with reference to FIG. 3B as an example.

FIG. 9A illustrates an arrangement of ID portions 6a and 6b and sectors $8_1$ and $8_2$ of one track. FIG. 9B shows position data corresponding to the start and end positions of the ID portions 6a and 6b and of the sectors $8_1$ and $8_2$. After being preset, therefore, the counter 501 outputs count values indicating the position data as shown in FIG. 9B. FIG. 9C shows output values from the ID/sector position counter 504. Therefore, the position data illustrated in FIG. 9B, which correspond to the start and end positions of the ID portions 6a and 6b and of the sectors $8_1$ and $8_2$, are written in the RAM 502 by the controller 14 each time the sector type is changed. Since the position of the start point (left end) of the ID portion 6a remains the same even if the sector type is changed, the data is so determined that this position has a value "100H" regardless of the sector type.

The contents of the RAM 502 of this embodiment are as shown in FIG. 10. Assume that the reference position on the optical card 16 is preset such that, for example, the count of the position counter 501 is "100H" when the optical head 26 reaches the start position (left end) of the ID portion 6a. In the following description, each numerical value ending with "H" is a hexadecimal number.

A forward track scan will be described first. In this case, the RAM address generating counter 500 and the position counter 501 operate as up counters since the scan is in the forward direction. Before the scan (movement of the conveyor table 22), the controller 14 presets "00H" in the RAM address generating counter 500 and resets the ID/sector position counter 504.

When the conveyor table 22 is driven to move the optical head 26 to the left end of the ID portion 6a in FIG. 9A, the output from the position counter 501 becomes "100H". At this time, since the output from the RAM address generating counter 500 is "00H", the RAM 502 outputs the data "100H". Therefore, the output "100H" from the RAM 502 coincides with the output from the position counter 501, so the output from the comparator 503 goes to "1".

Consequently, the RAM address generating counter 500 is counted up to supply "01H" as the address to the RAM 502, and the RAM 502 outputs "12DH" in response to the address "01H" as the end position of the ID portion 6a to the comparator 503. The ID/sector position counter 504 is also counted up to supply to the controller 14 a value "01H" indicating that the optical head 26 is currently within the ID portion 6a. On the basis of this output value from the ID/sector position counter 504, the controller 14 executes ID portion access and sector access.

when the optical head 26 further moves to the right end of the ID portion 6a, the output from the position counter 501 becomes "12DH". At this time, since the output from the RAM 502, which is the other input to the comparator 503, is "12DH", the comparator 503 again outputs "1". Consequently, both the RAM address generating counter 500 and the ID/sector position counter 504 indicate "02H", so the controller 14 detects that the optical head 26 has passed through the ID portion 6a.

That is, the controller 14 performs the following detection in accordance with the output value from the ID/sector position counter 504.

| Output from counter 504 | "01H" | "03H" | "05H" | "07H" |
|---|---|---|---|---|
| Current position of optical head | ID portion 6a | sector $8_1$ | sector $8_2$ | ID portion 6b |

Following the same procedure as described above, the controller 14 can detect the timings at which the optical head passes through the sector 81, the sector 82 and the ID portion 6b.

In the case of a reverse track scan, on the other hand, both the RAM address generating counter 500 and the position counter 501 operate as down counters. In addition, before the scan (movement of the conveyor table 22), the controller 14 presets "07H" in the RAM address generating counter 500 and resets the ID/sector position counter 504. The rest of the operation is exactly the same as that in the forward access discussed above. Consequently, the controller 14 performs the following detection in accordance with the output value from the ID/sector position counter 504.

| Output from counter 504 | "01H" | "03H" | "05H" | "07H" |
|---|---|---|---|---|
| Current position of optical head | ID portion 6b | sector $8_2$ | sector $8_1$ | ID portion 6a |

Note that if an up-down counter is used as the ID/sector position counter 504, it is only necessary to reverse the count direction each time the scan direction is switched. Consequently, the output value from the ID/sector position counter 504 can be related with the current position of the optical head 26 without presetting the initial value each time the scan direction is switched.

With the use of the sector position detection circuit 44 having the above arrangement, therefore, optical cards having different sector types can be processed with the simple configuration formed of the RAM, counters and comparator, and only by changing the contents of the RAM.

A preset operation when the optical card recording-/reproducing apparatus using the sector position detection circuit 44 as discussed above processes the optical card 16 having ID portions with the formats as shown in FIGS. 2A and 2B will be described below with reference to FIG. 11.

This preset operation can be effectuated by hardware or software or by a combination of hardware and software on the basis of reproduction signals from the optical head 26.

A track scan in the forward direction will be described first. In the case of the forward access, a preset operation of the position counter 501 is executed by reading the ID portion 6a on the left. This preset operation is normally done once after the optical card 16 is loaded on the conveyor table 22. Before execution of the preset operation, it is uncertain that the value of the position counter 501 is "100H" when the optical head reaches the left end of the ID portion 6a. Therefore, the preset operation is to set the value of the counter 501 to "100H" at this position.

When the conveyor table 22 is driven, detection for a preamble portion is started. In step #12, it is determined whether a preamble portion is detected. If a preamble portion is detected in step #12, the flow advances to step #16. If no preamble portion is detected in step #12, the flow advances to step #14 to check whether an elapsed time t from the start of driving is a predetermined time $t_1$ or more. This predetermined time $t_1$ is an approximate time from the drive start timing of the conveyor table 22 to the timing at which the optical head 26 passes through a preamble portion $6a_1$ of the ID portion 6a. Therefore, if the elapsed time t is less than the predetermined time $t_1$ in step #14, the flow returns to step #12. If the elapsed time t is equal to or longer than the predetermined time $t_1$ in step #14, "preset failure" is alarmed in step #30.

After a preamble portion is detected, detection for a sync portion is started. In step #16, it is determined whether a sync portion is detected. If a sync portion is detected in step #16, the flow advances to step #20. If no sync portion is detected in step #16, the flow advances to step #18 to check whether the elapsed time t from the start of driving is a predetermined time $t_2$ or more. This predetermined time $t_2$ is an approximate time from the drive start timing of the conveyor table 22 to the timing at which the optical head 26 passes through a sync portion $6a_5$ on the left side of the ID portion 6a. If, therefore, the elapsed time t is less than the predetermined time $t_2$ in step #18, the flow returns to step #16. If the elapsed time t is equal to or longer than the predetermined time $t_2$ in step #18, "preset failure" is alarmed in step #30.

If a sync portion can be detected subsequently to a preamble portion, the detected preamble portion is the preamble portion $6a_1$ and the detected sync portion is the left sync portion $6a_5$ (adjacent to the preamble portion $6a_1$), as can be readily understood from the format of the ID portion $6a$ illustrated in FIG. 2A. Note that the preamble portion $6a_1$ has the same pattern tern as that of a postamble portion $6a_2$, but it is possible to determine that the portion detected first is the preamble portion $6a_1$, rather than the postamble portion $6a_2$, since the access is in the forward direction.

In step #20, the track address is demodulated by assuming that the trailing end of the sync portion $6a_5$. thus detected is the start position of the track address and the demodulated data is error-corrected In step #22, it is determined whether the error is corrected by the error correction in step #20. If it is determined in step #22 that the error is not corrected, "preset failure" is alarmed in step #30. If it is determined in step #22 that the error is corrected, this means that the track address is identified.

Normally, the detection of a preamble portion, the detection of a sync portion, and the demodulation (and the error-correction) of a track address are executed by hardware dedicated to these tasks, and the procedures discussed above are performed of, e.g., a CPU of the controller 14 in many cases.

when the demodulation and the error correction of the track address end, the optical head 26 is supposed to be passing through a sync portion $6a_6$ between track address portions $6a_3$ and $6a_4$. If detection for a sync portion is performed, therefore, a sync portion to be detected next is supposed to be a sync portion $6a_7$ preceding to the postamble portion $6a_2$.

After the track address is demodulated, detection for a sync portion is again started. In step #24, it is determined whether a sync portion is detected. If a sync portion is detected in step #24, the flow advances to step #28. If no sync portion is detected in step #24, the flow advances to step #26 to check whether the elapsed time t from the start of driving is a predetermined time $t_3$ or more. This predetermined time $t_3$ is an approximate time from the drive start timing of the conveyor table 22 to the timing at which the optical head 26 passes through the right sync portion $6a_7$ of the ID portion $6a$. Therefore, if the elapsed time t is less than the predetermined time $t_3$ in step #26, the flow returns to step #24. If the elapsed time t is equal to or longer than the predetermined time $t_3$ in step #26, "preset failure" is alarmed in step #30.

When a sync portion is detected in step #24, the optical head is positioned at the left end of the postamble portion $6a_2$ (on the boundary between the sync portion $6a_7$ and the postamble portion $6a_2$). In step #28, therefore, the controller 14 presets a predetermined value corresponding to that position in the position counter 501. As shown in FIG. 9B, this predetermined value is a value measured from the left end of the ID portion $6a$ in which "100H" is set at the left end of the ID portion $6a$. More specifically, assuming that the rotary encoder 32 generates one encode clock each time the optical card 16 and the optical head 26 move relative to each other by 50 λm as discussed earlier, this predetermined value is "12AH" obtained by adding "100H" to a value (2.10/0.05 = "2AH") which is calculated by dividing the distance (which is predetermined for each format and is, e.g., 2.10 mm) from the left end of the ID portion $6a$ (the left end of the preamble portion $6a_1$) to the left end of the postamble portion $6a_2$(the boundary with the sync portion $6a_7$) by 50 μm. By this preset operation, the value of the position counter 501 necessarily becomes as illustrated in FIG. 9B. For this reason, the ID/sector position counter 504 changes its count in accordance with the ID portion and the sector as shown in FIG. 9C.

Note that "preset failure" is alarmed in the above processing if a preamble portion or a sync portion cannot be detected within the predetermined time. In such a case, a preset operation need only be executed again in the next scan.

In a track scan of the reverse direction, the preset operation is performed on the basis of scan on the ID portion $6b$. This reverse direction scan can be executed in precisely the same fashion as in the forward direction scan, since the ID portions $6a$ and $6b$ are identical, the data recorded in the preamble and postamble portions are the same although their names are different, and the ID portion is symmetrical. However, it is necessary to replace the preamble with the postamble and to change the preset value.

According to this embodiment as discussed above, before scan of a track of the data sector of an optical card with a format in which a plurality of track addresses are recorded in the ID portion, preamble and sync portions are detected in sequence. In addition, only when an address is demodulated and error-corrected, the position counter 501 is preset after the next sync portion is detected (in other words, when the start position of a postamble is detected). Therefore, the position counter 501 can be preset reliably. If the preset operation is executed immediately after the demodulation and the error correction of the address, the position of the optical head is unfixed at the time of presetting because the error correction time is indefinite. This makes correct presetting impossible. In this embodiment, however, since the preset operation is performed of detecting a sync portion after the error correction, the optical head is necessarily located at the start position of the postamble portion at the time of presetting. Therefore, a preset operation can always be performed correctly.

Furthermore, according to this embodiment, the data of the RAM 502 is rewritten in accordance with the sector format of the data portion. After the position counter 501 is preset, therefore, it is possible to accurately detect the recording/reproduction start point of each sector for any of optical cards having the different sector formats as illustrated in FIGS. 3A to 3C.

The second embodiment of the present invention relates to another example of the preset procedure for a position counter 501. The basic arrangement of this second embodiment is identical with that of the first embodiment, so a detailed description thereof will be omitted. The procedure of the second embodiment can be realized by simple hardware on the basis of reproduction signals from an optical head 26. However, it is also naturally possible to effectuate the procedure by using software or by using a combination of these hardware and software.

FIG. 12 is a flow chart for explaining the operation of the second embodiment.

A scan in the forward direction will be described first with reference to FIG. 12. In the forward scan, a preset operation for the position counter 501 is executed by reading an ID portion $6a$ on the left. This preset operation is normally done once after an optical card 16 is loaded on a conveyor table 22. Before execution of the preset operation, it is uncertain that the value of the position counter 501 is "100H" when the optical head reaches the left end of the ID portion 6a. Therefore, the preset operation is to set the value of the counter 501 to "100H" at this position.

When the conveyor table 22 is driven, detection for a preamble portion is started. In step #42, it is determined whether a preamble portion is detected. If a preamble portion is detected in step #42, the flow advances to step #46. If no preamble portion is detected in step #42, the flow advances to step #44 to check whether an elapsed time t from the start of driving is a predetermined time $t_1$ or more. This predetermined time $t_1$ is an approximate time from the drive start timing of the conveyor table 22 to the timing at which the optical head 26 passes through a preamble portion $6a_1$ of the ID portion 6a. Therefore, if the elapsed time t is less than the predetermined time $t_1$ in step #44, the flow returns to step #42. If the elapsed time t is equal to or longer than the predetermined time $t_1$ in step #44, "preset failure" is alarmed in step #52.

After a preamble portion is detected, detection for a sync portion is started. In step #46, it is determined whether a sync portion is detected. If a sync portion is detected in step #46, the flow advances to step #50. If no sync portion is detected in step #46, the flow advances to step #48 to check whether the elapsed time t from the start of driving is a predetermined time $t_2$ or more. This predetermined time $t_2$ is an approximate time from the drive start timing of the conveyor table 22 to the timing at which the optical head 26 passes through a sync portion $6a_5$ on the left side of the ID portion 6a. If, therefore, the elapsed time t is less than the predetermined time $t_2$ in step #48, the flow returns to step #46. If the elapsed time t is equal to or longer than the predetermined time $t_2$ in step #48, "preset failure" is alarmed in step #52.

If a sync portion can be detected subsequently to a preamble portion, the detected preamble portion is the preamble portion $6a_1$ and the detected sync portion is the left sync portion $6a_5$ (adjacent to the preamble portion $6a_1$), as can be readily understood from the format of the ID portion 6a illustrated in FIG. 2A. Note that the preamble portion $6a_1$ has the same pattern as that of a postamble portion $6a_2$, but it is possible to determine that the portion detected first is the preamble portion $6a_1$, rather than the postamble portion $6a_2$, since the scan direction is the forward direction.

When a sync portion is detected in step #46, the optical head is positioned at the right end of a sync portion $6a_5$ (on the boundary between the sync portion $6a_5$ and an address $6a_3$). In step #50, therefore, a controller 14 presets a predetermined value corresponding to that position in the position counter 501. As shown in FIG. 9B, this predetermined value is a value by which "100H" is set at the left end of the ID portion 6a. More specifically, assuming that a rotary encoder 32 generates one encode clock each time the optical card 16 and the optical head 26 move relative to each other by 50 λm as discussed earlier, this predetermined value is "104H" obtained by adding "100H" to a value (0.21/0.05="04H") which is calculated by dividing the distance (which is predetermined for each format and is, e.g., 0.21 mm) from the left end of the ID portion 6a (the left end of the preamble portion $6a_1$) to the right end of the sync portion $6a_5$ (the boundary with the address $6a_3$) by 50 μm. By this preset operation, the value of the position counter 501 necessarily becomes as illustrated in FIG. 9B. Therefore, an ID/sector position counter 504 changes its count in accordance with the ID portion and the sector as shown in FIG. 9C.

Note that if a preset operation fails, a preset operation is again executed in next scan.

A reverse direction scan can be executed in precisely the same fashion as in the forward direction scan, as in the first embodiment.

According to this embodiment as described above, the position counter 501 is preset only when both of the two characteristic fixed patterns (the preamble portion and the sync portion) of the ID portion are detected. Therefore, the position counter 501 can be preset reliably. Also, as in the first embodiment, it is possible to accurately detect the recording/reproduction start points of the individual sectors of optical cards having different sector formats. In addition, the procedure of presetting for the position counter 501 is simplified compared to that of the first embodiment. Therefore, the circuit configuration can also be simplified if the procedure is realized by hardware. If the procedure is effectuated by software, on the other hand, the control performed of the controller 14 is simplified, resulting in a higher operating speed.

In the third embodiment of the present invention, the preset procedures for a position counter 501 explained in the first and second embodiments are efficiently applied to an optical card recording/reproducing apparatus of a multi-track simultaneous read type.

In the third embodiment, a controller 14 need only execute the procedure described in the first or second embodiment for each track by using reproduction signals for individual tracks supplied from signal reproducing photodetector elements 94, 96 (or 108) and 98 shown in FIG. 7.

Figure 11:
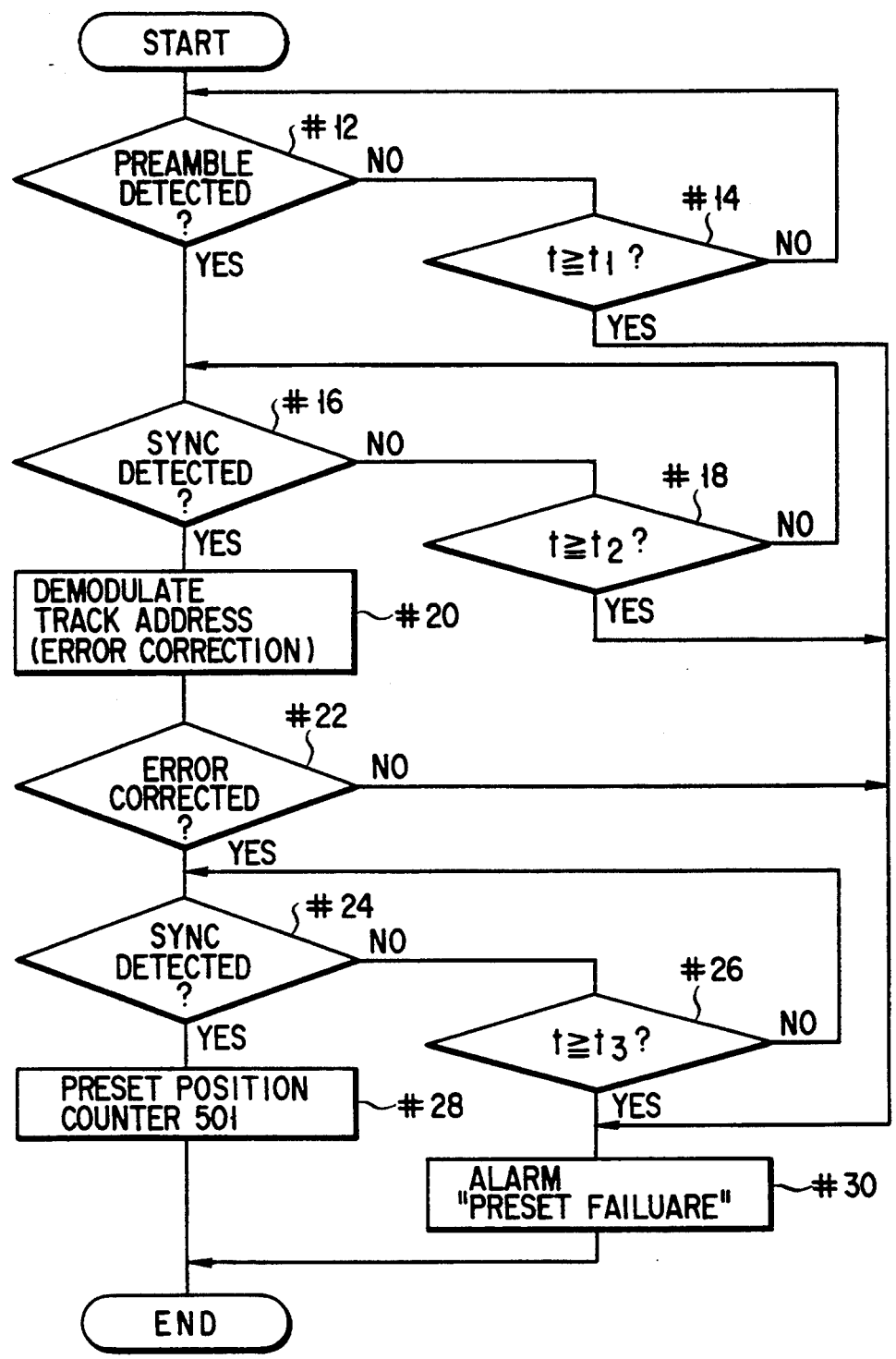
FIG. 11 is a flow chart showing a preset operation for a position counter according to the first embodiment.

In the case of the procedure of the first embodiment, for example, the preset operation for the position counter 501 is executed if the sync portion detection in step #24 of FIG. 11 is successfully done for at least one of three tracks. In the case of the procedure of the second embodiment, the preset operation for the position counter 501 is executed if the sync portion detection in step #46 of FIG. 12 is successfully done for at least one of three tracks.

Consequently, the preset operation for the position counter 501 is executed in the multi-track simultaneous read type optical card recording/reproducing apparatus, if conditions under which the position counter 501 is presettable are established by a reproduction signal from at least one track. This makes it possible to increase the probability of a successful preset operation for the position counter.

In the optical card recording/reproducing apparatus according to the present invention as has been described above, the initialization timing for the counter for outputting a count value corresponding to the moving distance of an optical card is determined by the combination of the detection results of the preamble portion and the sync portion which are two different types of patterns in the ID portion of the optical card. Therefore, a reliable preset operation for the counter can be realized, and the recording/reproduction start point of each sector can be detected accurately at any instant regardless of the loaded state of the optical card. This makes it possible to set a given recording/reproduction start point in each sector for an optical card of any sector format. Consequently, recording and reproduction can be performed for any optical card in which a given sector format is set in a data portion.

The present invention is not limited to the above embodiments but can be carried out in the form of various modifications. For example, each of the above embodiments has been described by taking the optical card recording/reproducing apparatus of a multi-track simultaneous read type having a single light source as an example, but the present invention is of course applicable to an optical card recording/reproducing apparatus of a single-track read type and a multi-track simultaneous read type having plural light sources. In addition, in the arrangement illustrated in FIG. 4, a rotary motor is used as the motor 104 for driving the conveyor table 22, and rotary encoders are used as the encoders 32 and 36. However, a linear motor and linear encoders can be used instead of the rotary motor and rotary encoders. Furthermore, the optical card need not be conveyed by the combination of the belt and the conveyor table but can be pinched between a pair of rollers and conveyed by rotating the rollers. Also, the card is not limited to the write-once type card but may be a read-only card or a magneto-optic card.

What is claimed is:

1. An optical card recording/reproducing apparatus for recording and/or reproducing data by relatively moving a recording/reproducing head and an optical card, the optical card having a track in which a data section is positioned at a center and in which identification sections are positioned at both ends, the data section comprising number of identification sectors which number is determined according to a format, the identification sections comprising at least two address areas, first synchronization areas adjacent to and between the address areas and second synchronization areas at both ends of the identification sections, in a direction of the track, the apparatus comprising:

a storing device for storing data representing positions of the sectors measured from an identification section;

a counter for counting an amount of relative movement of the recording/reproducing head and the optical card;

detecting means for detecting the first synchronization area and the second synchronization area;

means for presetting a predetermined count value to said counter when said detecting means detects the second synchronization area and then detects the first synchronization area; and means for detecting the position of a sector by comparing the count value of said counter and the data stored in said storing device.

2. An optical card recording/reproducing apparatus for recording for recording and/or reproducing data by relatively moving a recording/reproducing head and an optical card, the optical card having a track in which a data section is located at a center and in which identification sections are located at both ends, the data section comprising a number of sectors which number is determined according to a format, the identification sections comprising first and second address areas, a first byte synchronization area preceding the first address area, a second byte synchronization area between the first and second address areas, a third-byte synchronization area succeeding the second address area, a first bit synchronization area preceding the first byte synchronization area and a second bit synchronization area succeeding the third byte synchronization area, in a direction of the track, the apparatus comprising:

a storing device for storing data representing positions of the sectors measured from a predetermined point of the track;

a counter for counting an amount of relative movement of the recording/reproducing head and the optical card;

synchronization area detecting means for detecting the bit synchronization area and the byte synchronization area;

means for demodulating and error-correcting the first address when said detecting means detects the first bit synchronization area and then detects the first byte synchronization area, and for presetting said counter with a count value representing a position between the third byte synchronization area and the second bit synchronization area measured from the predetermined point of the track when said detecting means detects the third byte synchronization area after a demodulated first address is error-corrected; and sector position detecting means for detecting the position of the sector by comparing the count value of said counter and the data stored in said storing device.

3. An apparatus according to claim 2, further comprising means for updating said storing device when the format of the optical card changes.

4. An apparatus according to claim 2, wherein said sector position detecting means comprises:

an address counter for generating an address of said storing device;

a comparing device for comparing the address generated from said address counter and the data stored in said storing device, the comparing device supplying a "1" level signal to said address counter; and a further counter device for counting the "1" level signal output from said comparing means to detect the position of the sector.

5. An apparatus according to claim 2, wherein said synchronization area detecting means comprises:

means for simultaneously irradiating light onto plural tracks;

means for simultaneously receiving light reflected from the plural tracks; and means for detecting the bit synchronization area and the byte synchronization area when light reflected from at least one of the plural tracks represents the bit synchronization area and the byte synchronization area.

6. An optical card recording/reproducing apparatus recording and/or reproducing data by relatively moving a recording/reproducing head and an optical card, the optical card having a track in which a data section is located at a center and in which identification sections are located at both ends, the data section comprising a number of sectors which number is determined according to a format, the identification sections comprising first and second address areas, a first byte synchronization area preceding the first address area, a second byte synchronization area between the first and second address areas, a third byte synchronization area succeeding the second address area, a first bit synchronization area preceding the first byte synchronization area and a second bit synchronization area succeeding the third byte synchronization area, in a direction of the track, the apparatus comprising:
- a storing device for storing data representing positions of the sectors measured from a predetermined point of the track;
- a counter for counting an amount of relative movement of the recording/reproducing head and the optical card;
- synchronization area detecting means for detecting the bit synchronization area and the byte synchronization area;
- means for presetting said counter with a count value representing a position between the third byte synchronization area and the second bit synchronization area measured from the predetermined point of the track when said detecting means detects the first bit synchronization area and then detects the first byte synchronization area; and
- sector position detecting means for detecting the position of the sector by comparing the count value of said counter and the data stored in said storing device.

7. An apparatus according to claim 6, further comprising means for updating said storing device when the format of the optical card changes.

8. An apparatus according to claim 6, wherein said sector position detecting means comprises:
- an address counter for generating an address of said storing device;
- a comparing device for comparing the address generated from said address counter and the data stored in said storing device, for comparing device supplying a "1" level signal to said address counter; and
- a further counter device for counting the "1" level signal output from said comparing means to detect the position of the sector.

9. An apparatus according to claim 6, wherein said synchronization area detecting means comprises:
- means for simultaneously irradiating light onto plural tracks;
- means for simultaneously receiving light reflected from the plural tracks; and
- means for detecting the bit synchronization area and the byte synchronization area when light reflected from at least one of the plural tracks represents the bit synchronization area and the byte synchronization area.

* * * * *